May 5, 1970     T. M. YEGO, JR     3,510,108

RICE WASHER

Filed May 7, 1968

INVENTOR
THOMAS M. YEGO, JR.

BY Beale and Jones

ATTORNES

United States Patent Office 3,510,108
Patented May 5, 1970

3,510,108
RICE WASHER
Thomas M. Yego, Jr., 1351 Cornell Way,
Sacramento, Calif. 95831
Filed May 7, 1968, Ser. No. 727,174
Int. Cl. B08b 3/02
U.S. Cl. 259—4    13 Claims

ABSTRACT OF THE DISCLOSURE

A container designed particularly for washing rice and like foods preparatory to cooking is provided, the container having a perforated cover and a centrally-located opening for directing into the container a flow of water for agitating and thus washing contained articles. The cover is divided into three parts, two parts being fixed in place, the third part being hinged to one of the other two parts for access to the interior of the container. All three parts are perforated to permit outflow of water.

FIELD OF THE INVENTION

The present invention relates, in general, to food containers and, more particularly to a container for washing rice and like articles preparatory to cooking.

DESCRIPTION OF THE PRIOR ART

It is well known that refined rice should be carefully washed prior to cooking in that bulk amounts of this rice generally contain a considerable amount of foreign matter. In order to remove all of the undesired particles, it is necessary to agitate the rice while washing it, and to thoroughly stir it.

In the past, this operation has been carried out in a standard colander, or strainer, with water running from a faucet. The colander had to be shaken to stir the rice, with the inevitable loss of at least a portion of the rice along with the foreign particles.

It has been proposed to wash rice in a container such as a bowl, and to agitate the rice by means of a paddle, but this method does not provide much improvement over the colander.

SUMMARY OF THE INVENTION

The present invention overcomes the disadvantages of the prior art, and meets a long-standing need for an efficient yet inexpensive, device for washing refined rice. The container of the present invention is generally cylindrical in shape, with a flat bottom that is rounded where it meets the wall of the cylinder. The cover comprises an outer edge circular in shape and divided into three parts by means of dividers radiating from a center portion. Two parts are held snugly in place on the cylindrical wall by a pressure fit, while the third part is hinged to permit opening and closing. The spaces defined by the outer edge, the center portion and the radiating dividers is covered by a suitable screening. Means are provided at the center of the cover to permit inflow of water. After circulation through the container, and consequent agitation and washing of rice therein, the water flows out through the screening, carrying with it the foreign materials. Rice may be placed in and removed from the container by way of the hinged cover portion. This arrangement allows a thorough washing of refined rice and efficient removal of foreign particles prior to cooking with only a moderate water pressure.

BRIEF DESCRIPTION OF THE DRAWINGS

The foregoing and additional advantages and features of the present invention will best be understood and appreciated from the following detailed description of a preferred embodiment thereof, selected for purposes of illustration and shown in the accompanying drawings, in which.

DESCRIPTION OF THE PREFERRED EMBODIMENT

Figure 1:
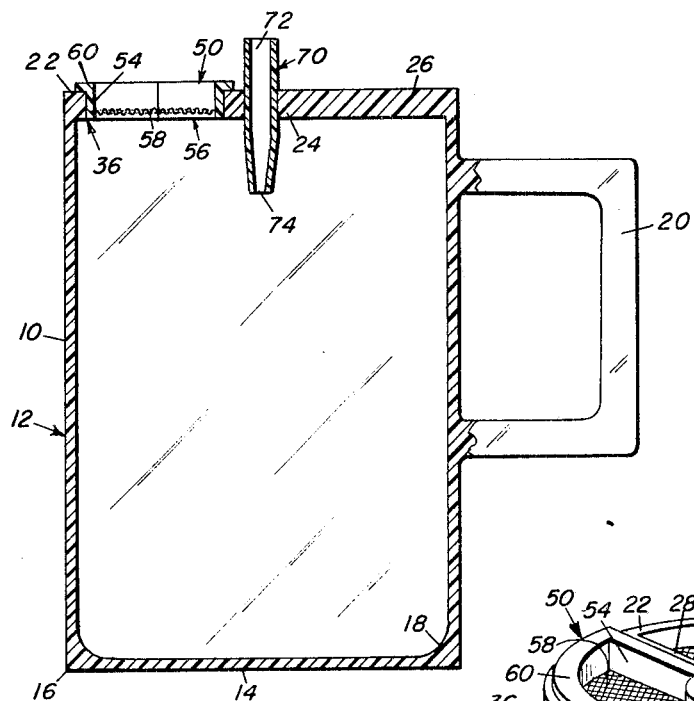
FIG. 1 is a cross-sectional side view, taken along line I—I of FIG. 2, of one form of the invention.

Turning now to a consideration of the drawings, FIG. 1 illustrates at 10 the generally cylindrical side wall of a rice washer 12 made in accordance with the present invention. The container 12 is formed with an end wall, or bottom, 14 which is shown as having a flat exterior surface, but which may be provided with a downwardly protruding ridge or rim portion, or may be of any other suitable design conventional in the container art. The junction of the bottom 14 and the side wall 10 around the circumference of the wall may be slightly rounded at the exterior surface, or may be squared, as illustrated at 16; the interior surface junction is rounded, as at 18, to provide proper water circulation within the container to insure thorough washing of all the rice grains within the container.

A handle 20 of suitable shape and dimension is attached to the side wall 10.

Figure 2:
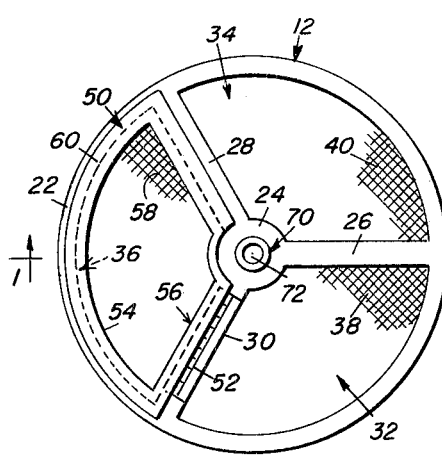
FIG. 2 is a top plan view of the embodiment of FIG. 1.

The cover for container 12 is illustrated in FIG. 2 as comprising an annular outer edge portion 22, a central hub portion 24, and radial dividers 26, 28 and 30 extending from the hub to the outer edge portion. The radial dividers perferably are substantially equally spaced about the hub to define three substantially equal cover segments, or openings 32, 34 and 36. It will be apparent that two dividers could be used to support the hub, that more than three could be used, or that the dividers could be unequally spaced, if desired. However, the preferred construction utilizes three dividers equally spaced.

Segments 32 and 34, which lie between radial dividers 26 and 30 and dividers 26 and 28, respectively, are covered by a suitable perforated sheet material, or web, such as plastic screening, as indicated generally at 38 and 40. This screening will preferably be made as part of a unitary cover or untary container, and thus would be of the same material as the remainder of the cover. Alternatively, the screen may be a separate piece fastened to the cover segments, or openings, by a suitable cement. For the purpose of the present invention, it has been found that the perforations in the screen material should have a maximum dimension (length, width or diameter, depending on the particular configuration used) of approximately 0.094 inch. This size will permit foreign particles to be carried out of the container during washing operations, but will prevent loss of rice or like granular material being cleaned.

The outer edge and radial dividers are dimensioned so as to have sufficient strength to support the central hub, the screen and the lid to be described, and thus will normally be substantially thicker than the screen material, as indicated in the drawings.

The outer edge 22 of the cover preferably is permanently attached to the upper circumferential rim of the cylindrical side wall 10, so that approximately two-thirds of the upper end of the cylinder is closed by the radial dividers and the screened segments 38 and 40. This annular outer edge portion of the cover may be shaped with a recess to receive the upper rim of side wall 10, and may be permanently cemented into place. Alternatively, the outer edge 22 and the upper end of the side wall may be threaded so that the cover may be screwed onto the body of the container, or the cover and upper end may be shaped for a pressure fit or a "snap-on" fit of conventional design. Preferably, however, the container, which includes the side wall, end wall and cover, will be formed as a single unit from a suitable material, as will be described below, so that the cover structure thus far described will not be part of a separate element. In such a configuration, the annular outer edge of the cover would be formed as a part of the upper end of the cylindrical side wall, as illustrated in the drawings.

The segment 36 of the cover defined by outer edge 22, hub 24 and dividers 28 and 30 receives a separate, movable lid 50 which preferably is hingedly attached to one of the dividers 28 or 30, as by means of hinge 52. The lid comprises an edge portion 54 shaped to fit snugly into cover segment 36 and to define a lid segment 56. The lid segment is covered with a perforated sheet material 58 such as the screening used on cover segments 38 and 40.

The edge portion 54 of the lid may have any suitable cross-sectional configuration which will hold it firmly in place when the lid is closed and the container is in use, but which will permit the lid to be opened easily to permit filling and emptying of the container. As illustrated in FIG. 1, the edge 54 may be generally L-shaped in cross-section to provide a lip 60 which protrudes over radial dividers 28 and 30 and edge portion 22 to prevent the lid from being pressed downwardly into the interior of the container. Alternative equivalent configurations will be apparent to those skilled in the art.

At the center of hub 24 is located an inlet tube 70 which is permanently affixed to the cover. The inlet tube extends through the central hub and is adapted at its upper end 72 to receive flexible tubing or the like (not shown) leading from a water supply such as a conventional water faucet. The lower end 74 of inlet tube 70 extends down into the interior of the container and is flattened to provide a nozzle which serves to increase the velocity of the water flow to the container. In one embodiment, the inlet tube extends approximately one inch into the container and is flattened to provide an opening 0.036 inch wide and 0.563 inch long; however, other dimensions will be found to be suitable, depending on the size of the container, the diameter of the inlet tube, and the pressure of the available water supply.

It is preferred that the entire container, including the cover and the screening for the cover segments but excluding the lid portion, be molded or otherwise formed as a single unit. The lid portion would be similarly formed and would be fastened to the cover by means of a suitable hinge. The hinge may be formed as a part of either the cover or the lid, or may be a separate element. Alternatively, the entire container, including the end wall, side wall, cover and the lid and its hinge, may be formed as a single unit.

Figure 3:
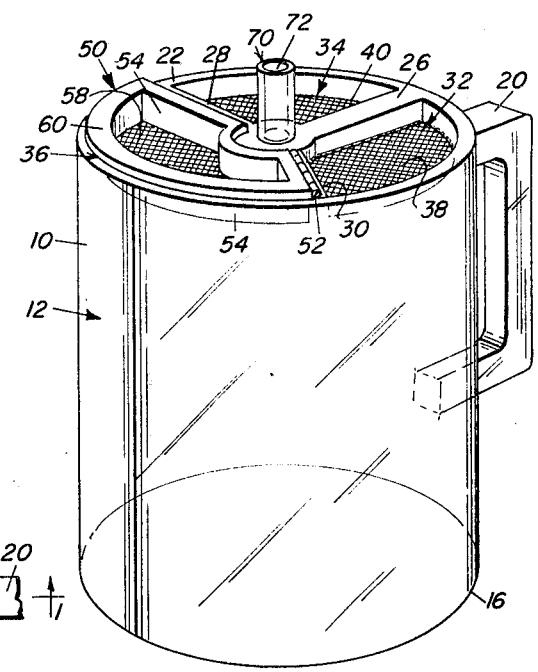
FIG. 3 is a perspective view of the embodiment of FIG. 1.

FIG. 3 of the drawings is a perspective view of a container made in accordance with the present invention, and is included to better illustrate the relationship of the various elements of the container and its cover. Although the lid 50 may be detached from the cover, it will be apparent that in practice the lid preferably will be attached to divider 30 by means of hinge 52. Of course, the lid may be constructed as a separate element, without the hinge means 52, or the lip portion 60 may itself comprise the hinge portion along that part of the lid which is adjacent one of the dividers.

The container of the present invention may be formed from any suitable material. Examples of such material would be any of the known plastics such as the polypropylenes, polyethylenes, polystyrenes, polyacrylates, or polyvinyl chlorides, the particular material selected depending upon the exact properties desired for the container, such as flexibility, strength, heat resistance and the like. The size and dimensions of the container are not critical, but it has been found that a two to three quart cylindrical container having a height about one and one-half times its diameter produces satisfactory results.

In use, the material to be washed, refined rice, for example, is placed in the container through the cover segment which receives the lid, and the lid is closed tightly. Water is forced into the container through inlet tube 70, the nozzle portion 74 of the tube causing the water to flow with sufficient force and direction to agitate the rice continuously. After the container has filled with water, the excess flows upwardly through the screening 38, 40 and 58 and spills over the side of the container, carrying with it foreign material mixed in with the rice grains. As has been noted, the screening is of such a size as to prevent the rice grains from being carried out of the container by the water outflowing therefrom. The continuing flow of water through inlet tube 70 will keep the rice in constant agitation, with the rounded bottom corner 18 serving to establish a circulatory motion in the water flow which insures that all of the rice will be cleansed. The length of time required for cleaning will depend upon the amount of rice in the container, the rate of water flow, and the degree of cleanliness desired, but it has been found that the present device permits adequate cleaning with only a moderate amount of water. For example, three cups of refined rice can be cleaned for cooking in about five minutes at about one-third the usual household faucet water flow.

Thus, there have been provided by the present invention an efficient, yet simple device for washing refined rice or other grains, fruits or vegetables. However, various modifications of the present invention will be apparent to those skilled in the art; for example, the outer edge 22 of the cover may not extend around the full circumference of the side wall 10, but may, instead, be omitted from that portion of the rim which is located between radial dividers 28 and 30. Thus the outer edge of the cover would be generally C-shaped, with the open part of the outer edge lying in the area of lid 50. In such a case, the lid would extend to the side wall 10, and would fit snugly in the segment defined by the side wall, dividers 28 and 30, and central hub 24.

I claim:

1. A container for washing granular material comprising a bottom portion and an upstanding side wall portion, segmented cover means for said container, one segment of said cover means being adapted to receive movable lid means, screening means on said cover means and said lid means, inlet means for directing water into said container to agitate and thus clean said granular material, excess water flowing out of said container through said screening means and wherein said segmented cover means is comprised of an outer edge, a central hub, and at least two radial dividers extending from said hub to said outer edge to define the segments of said segmented cover means.

2. The container of claim 1, wherein said inlet means is located at and extends through said central hub.

3. The container of claim 1, wherein said outer edge of said cover means is affixed to said side wall.

4. The container of claim 1, wherein said lid means is hingedly attached to one of said radial dividers and is adapted to fill one of said segments, said screening means covering the remaining segments.

5. The container of claim 1, wherein said side wall portion forms a cylinder and said outer edge of said segmented cover means is annular and of a diameter sufficient to engage the end of said cylinder, said central hub is supported at the axis of said annular outer edge by said radial dividers, said inlet means extending through said central hub, and said lid means is hingedly attached to one of said radial dividers.

6. The container of claim 5, wherein said bottom portion is sloped upwardly at its junction with said cylindrical wall around the circumference of said wall.

7. A unitary container for use in washing rice and like granular material, comprising a cylindrical side wall; an end wall; and a segmented cover, said cover including an annular outer edge portion at the junction of said side wall and said cover, a central hub, radial divider means extending from said hub to said outer edge to define the segments of said segmented cover, lid means for one of said segments, a screen covering the remaining segments and inlet means carried by said cover for directing water into said container.

8. The container of claim 7, wherein said lid means is movable, and is hingedly attached to one of said radial divider means.

9. The container of claim 8, wherein said lid includes a lid edge portion shaped to fit within said one of said segments, said lid edge portion defining a lid segment, and a screen covering said lid segment.

10. The container of claim 7, wherein said cover includes three radial divider means substantially equally spaced about said central hub to define substantially equal segments.

11. The container of claim 7, wherein said lid is separate and independent of said unitary container, includes an edge portion shaped to fit within said one of said segments, and is covered with a screen.

12. The container of claim 7, further including water inlet means located in said central hub, whereby water under pressure may be introduced into said container, said screen permitting excess water to flow out of said container while preventing loss of said rice and like granular material.

13. The container of claim 12, wherein said water inlet means comprises an inlet tube extending through said central hub, said inlet tube having a nozzle portion to impart increased velocity to water introduced into said container, whereby said rice and like granular material will be agitated and washed, the junction of said side wall with said end wall being rounded to assist in circulating the water introduced into said container.

References Cited

UNITED STATES PATENTS

| | | | |
|---|---|---|---|
| 536,911 | 4/1895 | Berridge | 222—189 |
| 947,025 | 1/1910 | Pearl et al. | 210—245 |
| 954,129 | 4/1910 | Newlove | 210—474 |
| 1,103,431 | 7/1914 | Pullman | 210—466 XR |
| 2,397,163 | 3/1946 | Serkes et al. | 210—469 |
| 2,964,047 | 12/1960 | Jackson et al. | 134—183 |
| 3,260,510 | 7/1966 | Ranson | 259—4 |
| 3,314,659 | 4/1967 | Ransom | 259—4 |

DANIEL BLUM, Primary Examiner

U.S. Cl. X.R.
134—200; 210—474